DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 834

T896,045
DETERGENT BAR

William L. Groves, Jr., 715 N. 7th St.,
Ponca City, Okla. 74601

Continuation of abandoned application Ser. No. 773,296, Nov. 4, 1968. This application Mar. 15, 1971, Ser. No. 124,432

Int. Cl. C11d *1/14, 9/46*
U.S. Cl. 252—121
No Drawing. 21 Pages Specification

A detergent bar exhibiting excellent curd dispersing characteristics, good lathering properties, and a low wear rate can be prepared from a mixture of about 55–83% of an alkali metal soap having about 15–30% of a $C_{12}$ to $C_{18}$ alpha olefin sulfonate dispersed throughout, and from about 2–15% moisture. The soap may be derived from tallow coconut oil mixtures or the bar may be free of coconut oil soaps. About 25–40 percent of the alkali metal soap may be replaced with a magnesium soap to improve the hardness of the bar. The additional inclusion of up to 10% of an alkyl aryl sulfonate, such as an alkyl benzene sulfonate with a $C_5$ to $C_{18}$ linear alkyl moiety, further enhances the lime soap dispersion characteristics of the bar.